US012269379B2

(12) United States Patent
Tomioka et al.

(10) Patent No.: US 12,269,379 B2
(45) Date of Patent: Apr. 8, 2025

(54) CONVEYANCE SEAT

(71) Applicants: TS TECH CO., LTD., Asaka (JP); HONDA MOTOR CO., LTD., Tokyo (JP)

(72) Inventors: Kotaro Tomioka, Tochigi (JP); Sadahiro Kinoshita, Tochigi (JP); Tsubasa Hitomi, Tochigi (JP); Masaaki Yamaguchi, Tochigi (JP)

(73) Assignees: TS TECH CO., LTD., Asaka (JP); HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 18/186,651

(22) Filed: Mar. 20, 2023

(65) Prior Publication Data
US 2023/0302969 A1    Sep. 28, 2023

(30) Foreign Application Priority Data
Mar. 22, 2022  (JP) ................................ 2022-045927

(51) Int. Cl.
*B60N 2/28* (2006.01)
(52) U.S. Cl.
CPC ................. *B60N 2/2806* (2013.01)
(58) Field of Classification Search
CPC ............................ B60N 2/2806; B60N 2/2866
USPC ............... 297/452.13, 452.38, 452.47, 250.1
See application file for complete search history.

(56) References Cited

U.S. PATENT DOCUMENTS

| 4,637,650 | A | * | 1/1987 | Inoue | B60N 2/58 297/378.13 |
| 4,786,103 | A | * | 11/1988 | Selbert | B60N 2/70 297/452.59 |
| 5,009,469 | A | * | 4/1991 | Mouri | B60R 22/02 297/468 |
| 5,667,242 | A | * | 9/1997 | Slack | B60R 21/207 280/730.2 |
| 5,845,966 | A | * | 12/1998 | Severinski | B60R 21/207 280/730.2 |
| 7,469,965 | B2 | * | 12/2008 | Glover | A44B 11/10 297/484 |
| 7,901,002 | B2 | * | 3/2011 | Mashimo | B60N 2/5825 297/226 |
| 8,109,571 | B2 | * | 2/2012 | Chen | B60N 2/2821 297/250.1 |

(Continued)

FOREIGN PATENT DOCUMENTS

DE    102017106551 A1 * 12/2017 .............. B60N 2/28
JP       2018079798 A    5/2018

*Primary Examiner* — Jose V Chen
(74) *Attorney, Agent, or Firm* — Dority & Manning, P.A.

(57) ABSTRACT

A conveyance seat includes a cover member protecting an anchor member extending from the seat main body so that a child safety seat is connected. The cover member includes an outside cover, and an inside cover accommodated in the outside cover and having an anchor engaging portion. The cover member sandwiches an extending part of the anchor member with the outside cover and the inside cover. The cover member is attached to the seat main body such that an outer periphery portion of a skin opening hole is sandwiched by the outside cover and the inside cover. A skin locking member is accommodated in a flange accommodating recess of the outside cover together with an outer peripheral flange of the inside cover.

4 Claims, 12 Drawing Sheets

(56) References Cited

U.S. PATENT DOCUMENTS

| | | | |
|---|---|---|---|
| 2011/0012417 A1* | 1/2011 | Vlahovic | B60R 21/04 |
| | | | 297/452.38 |
| 2013/0093233 A1* | 4/2013 | Kajihara | B60N 2/58 |
| | | | 297/452.38 |
| 2014/0159448 A1* | 6/2014 | Williams | B60N 2/2887 |
| | | | 297/250.1 |
| 2014/0203618 A1* | 7/2014 | Line | B60N 2/6027 |
| | | | 297/452.38 |
| 2015/0008716 A1* | 1/2015 | Dry | B60N 2/56 |
| | | | 297/452.38 |
| 2018/0056820 A1* | 3/2018 | Sammons | B60N 2/2887 |
| 2022/0024358 A1* | 1/2022 | Kang | B60N 2/2816 |
| 2023/0095604 A1* | 3/2023 | Krumbein | B60N 2/686 |
| | | | 297/250.1 |
| 2023/0145513 A1* | 5/2023 | Hong | B60N 2/686 |
| | | | 297/250.1 |

* cited by examiner

FIG. 1
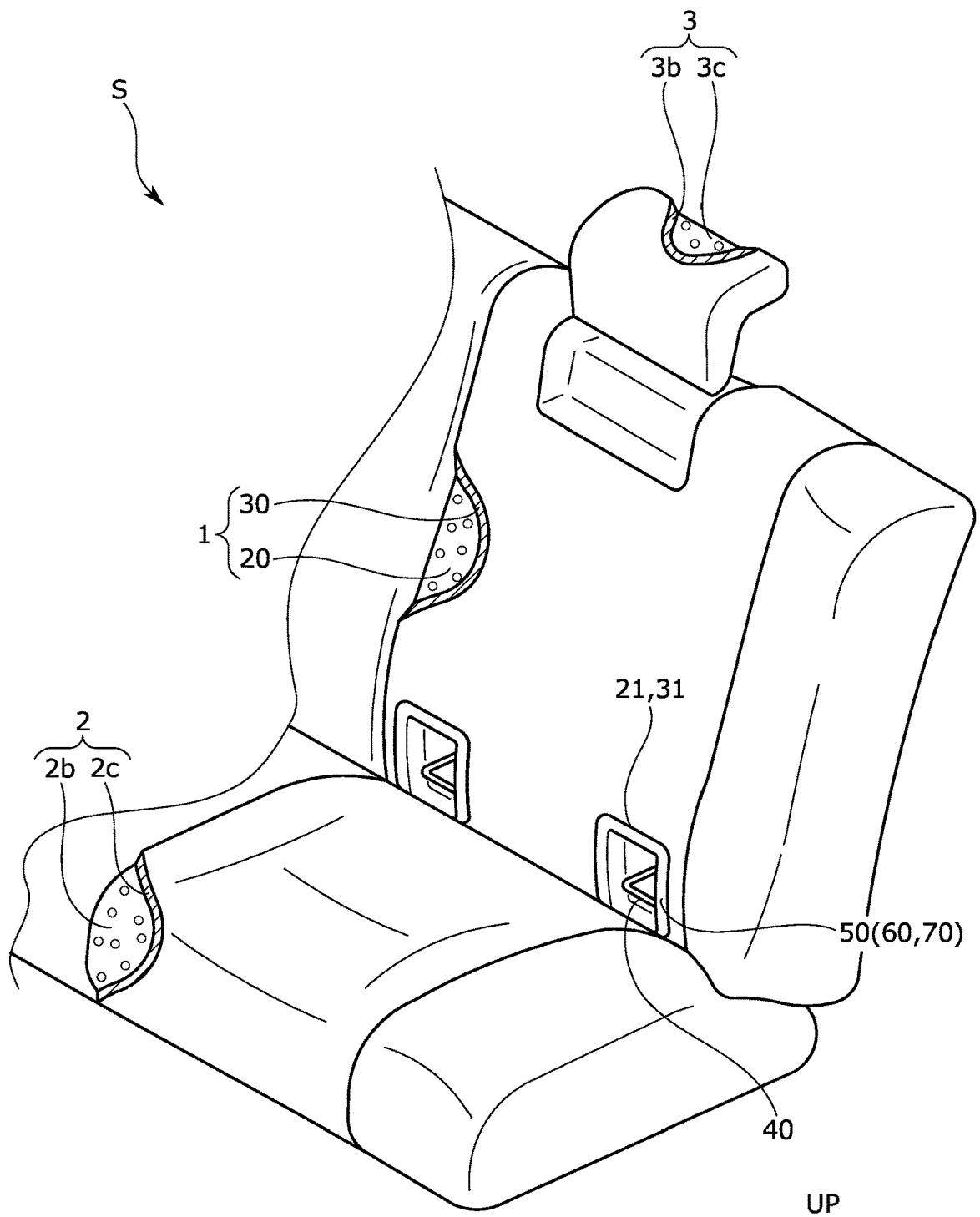
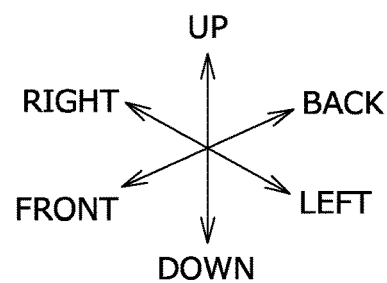

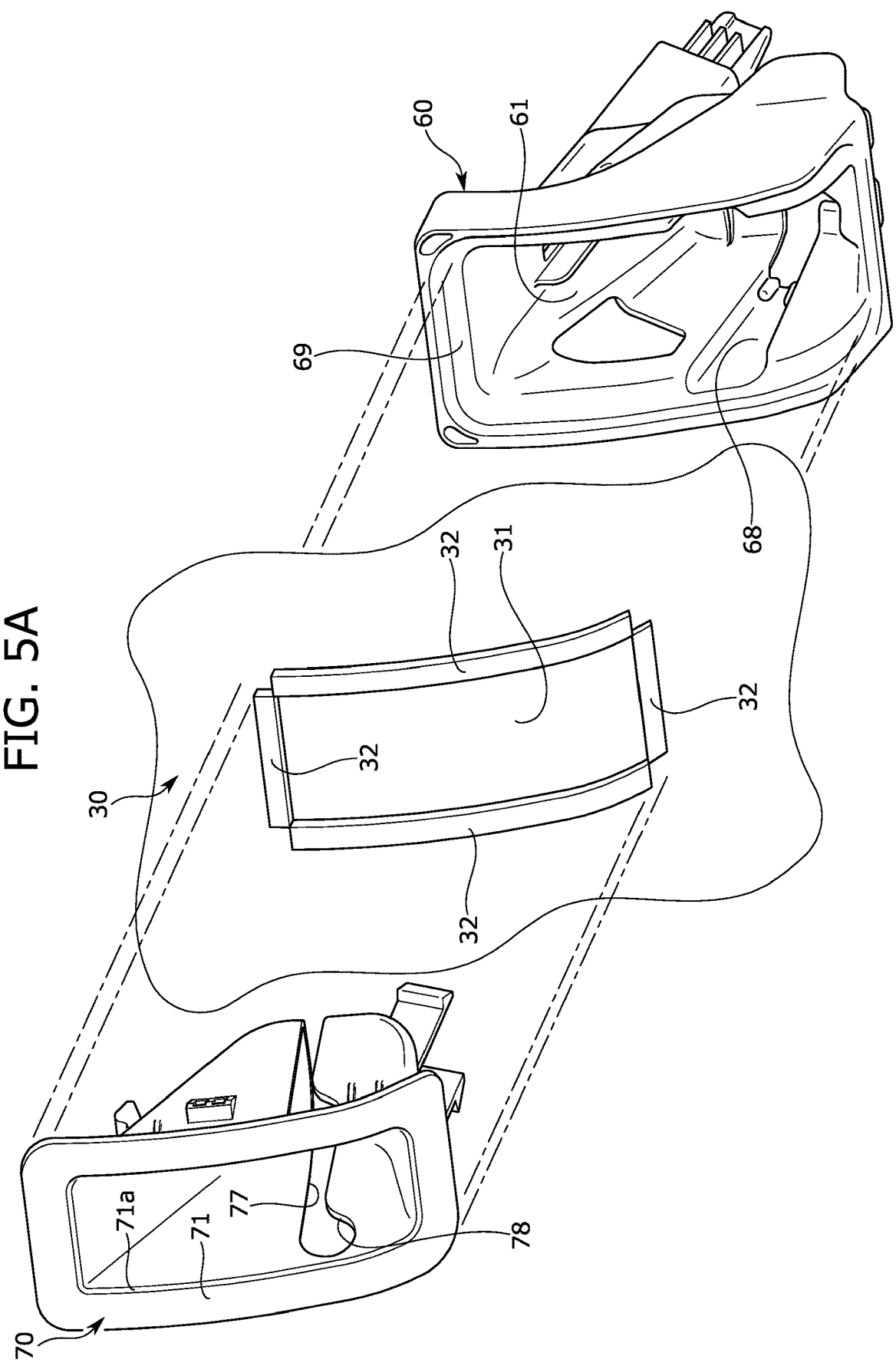

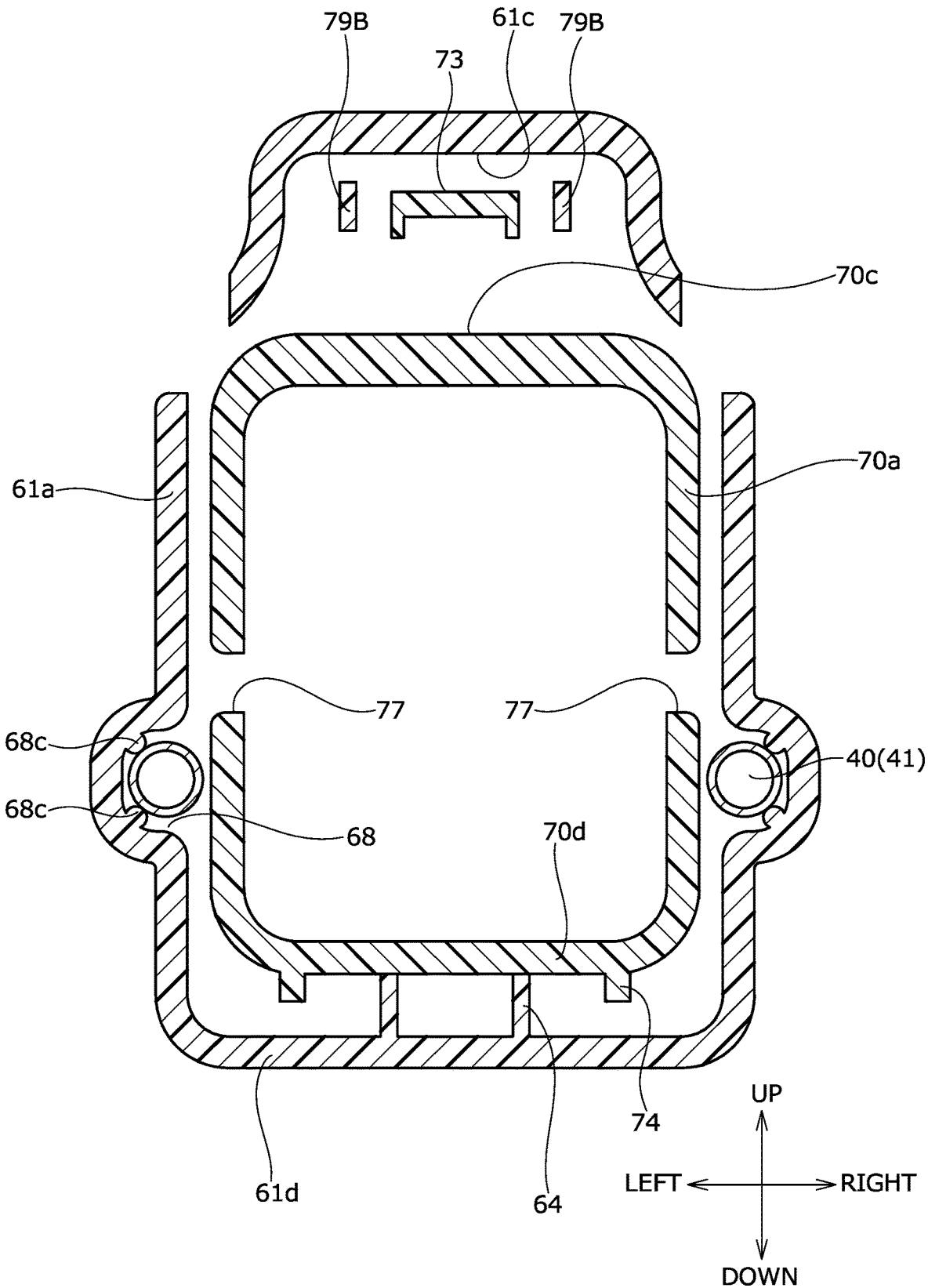

CONVEYANCE SEAT

CROSS REFERENCE TO RELATED APPLICATIONS

This application claims priority to Japanese Patent Application No. 2022-045927, filed on Mar. 22, 2022, which is hereby incorporated herein by reference in its entirety for all purposes.

FIELD OF THE INVENTION

The present invention relates to a conveyance seat. More particularly, the present invention relates to a conveyance seat provided with a cover member protecting an anchor member for connecting an object to be connected (child safety seat).

BACKGROUND OF THE INVENTION

Known in the related art is a vehicle seat including an anchor member (tether anchor) attached to a seat frame (back frame) serving as the skeleton of the seat main body and extending to the seat front from the back frame so that a child safety seat is connected. Also known is a vehicle seat further including a cover member for protecting the anchor member from the outside.

It should be noted that examples of child safety seat-connectable vehicle seats include a type in which an anchor member is attached to a seat frame and the type of direct attachment to a vehicle body frame serving as the skeleton of a vehicle body (see, for example, Japanese Patent Laid-Open No. 2018-79708).

The conveyance seat disclosed in Japanese Unexamined Patent Publication No. 2018-79708 includes a cover member protecting an anchor member for child safety seat connection extending to the front of the seat from a vehicle body frame.

The cover member is attached from the seat front with respect to the anchor member penetrating the lower end portion of the seat back. In addition, the cover member has an outside cover attached to the lower end portion of the seat back and covering the anchor member and an inside cover attached to the outside cover in a state of being accommodated in the outside cover and having an anchor engaging portion engaging with the anchor member.

In the above configuration, the cover member is attached to the seat back such that a portion of a conveyance seat covering material (outer periphery portion of opening hole formed in the covering material) is sandwiched by the inside cover and the outside cover. Therefore, the outer appearance around the cover member is improved.

By the way, in the conveyance seat disclosed in Japanese Unexamined Patent Publication No. 2018-79708, which is provided with the cover member protecting the anchor member for child safety seat connection, the cover member is attached with respect to the seat frame (seat back) and the anchor member, and thus the attachment rigidity of the cover member needs to be further increased so that the cover member does not rattle while the conveyance travels.

In addition, there has been a demand for a conveyance seat capable of facilitating cover member attachment while ensuring a satisfactory appearance around the cover member.

The present invention has been made in view of the above circumstances, and an object of the present invention is to provide a conveyance seat including a cover member protecting an anchor member for connecting an object to be connected and capable of enhancing the attachment rigidity of the cover member.

In addition, another object of the present invention is to provide a conveyance seat capable of facilitating cover member attachment while ensuring a satisfactory appearance around the cover member protecting the anchor member.

SUMMARY OF THE INVENTION

The above object is achieved by means of a conveyance seat of the present invention including a cover member protecting an anchor member extending outward from a conveyance main body or a seat main body so that an object to be connected is connected, in which the cover member includes an outside cover attached to the seat main body and covering the anchor member, and an inside cover attached to the outside cover in a state of being accommodated in the outside cover and having an anchor engaging portion engaging with the anchor member, when the cover member is engaged with the anchor member, an extending part of the anchor member extending outward from the conveyance main body or the seat main body is sandwiched by the outside cover and the inside cover, the seat main body has a skin material serving as a covering material for the seat main body, a portion of the skin material corresponding to the cover member is provided with a skin opening hole for exposing the anchor member and a skin locking member attached to an outer periphery portion of the skin opening hole for locking to the cover member, the cover member is attached to the seat main body such that the outer periphery portion of the skin opening hole is sandwiched by the outside cover and the inside cover, an outer peripheral flange protruding toward an outside of the inside cover is formed at an outer periphery portion of the inside cover, a surface of the outside cover facing the inside cover is formed with a flange accommodating recess formed so as to be recessed toward a side opposite to the inside cover side in order to accommodate the outer peripheral flange, and the skin locking member is accommodated in the flange accommodating recess together with the outer peripheral flange and is sandwiched between the outer peripheral flange and the flange accommodating recess.

With the above configuration, it is possible to realize a conveyance seat including a cover member protecting an anchor member for connecting an object to be connected with the attachment rigidity of the cover member enhanced.

Specifically, when the cover member is engaged with the anchor member, the extending part of the anchor member extending outward from the conveyance main body or the seat main body is sandwiched by the outside cover and the inside cover, and thus it is possible to further enhance the attachment rigidity of the cover member with respect to the anchor member as compared with the related art.

It should be noted that the anchor member may be attached to the seat main body or may be attached to the conveyance main body.

In addition, as described above, the outer periphery portion of the skin opening hole of the skin material is provided with the skin locking member for locking to the cover member, and thus the cover member can be easily attached to the skin material. In addition, it is possible to enhance the attachment rigidity of the cover member with respect to the skin material.

In addition, as described above, the skin locking member is sandwiched between the outer peripheral flange of the inside cover and the flange accommodating recess of the outside cover, and thus exposure of the skin locking member to the outside can be suppressed. Therefore, the appearance of the periphery of the cover member can be improved.

At this time, the cover member may protect the anchor member extending to a seat front from the conveyance main body or the seat main body so that a child safety seat is connected, when the inside cover is attached to the outside cover, an accommodating space for accommodating the skin locking member may be formed between the outer peripheral flange and the flange accommodating recess, a skin passing hole leading to the accommodating space may be formed in a gap between an outer periphery portion of the surface of the outside cover facing the inside cover and the outer peripheral flange of the inside cover, and the skin passing hole may be formed so as to be narrower than the skin locking member.

With the above configuration, it is possible to realize a conveyance seat including a cover member protecting an anchor member for child safety seat connection with the attachment rigidity of the cover member enhanced.

In addition, as described above, the outer periphery portion of the skin opening hole of the skin material is provided with the skin locking member for locking to the cover member, and thus the cover member can be easily attached to the skin material. In addition, it is possible to enhance the attachment rigidity of the cover member with respect to the skin material.

In addition, as described above, the skin locking member is sandwiched between the outer peripheral flange of the inside cover and the flange accommodating recess of the outside cover, and thus exposure of the skin locking member to the outside can be suppressed. Therefore, the appearance of the periphery of the cover member can be improved.

At this time, an outer surface of the inside cover and an outer surface of the skin material may be substantially flush when the cover member is attached to the seat main body in a state of sandwiching the outer periphery portion of the skin opening hole.

With the above configuration, it is possible to further improve the appearance of the periphery of the cover member.

At this time, the skin opening hole may be a substantially polygonal opening hole, and a plurality of the skin locking members may be disposed at intervals at the outer periphery portion of the skin opening hole or a portion around the skin opening hole and may be respectively disposed at positions avoiding corner portions of the skin opening hole.

As described above, the plurality of skin locking members are disposed at intervals, and thus it is possible to further enhance the attachment rigidity of the cover member with respect to the skin material.

In addition, as described above, the skin locking members are respectively disposed at positions avoiding the corner portions of the skin opening hole, and thus the outer periphery portion of the skin opening hole can be easily expanded and contracted. Therefore, the cover member can be more easily attached to the skin material (outer periphery portion of skin opening hole).

According to the present invention, it is possible to realize a conveyance seat including a cover member protecting an anchor member for connecting an object to be connected (child safety seat) with the attachment rigidity of the cover member enhanced.

In addition, according to the present invention, the cover member can be easily attached to the skin material. In addition, it is possible to enhance the attachment rigidity of the cover member with respect to the skin material. In addition, exposure of the skin locking member to the outside can be suppressed. Therefore, the appearance of the periphery of the cover member can be improved.

In addition, according to the present invention, it is possible to suppress the skin locking member coming off the cover member and exposure of the skin locking member to the outside can be further suppressed.

In addition, according to the present invention, it is possible to further improve the appearance of the periphery of the cover member.

In addition, according to the present invention, the outer periphery portion of the skin opening hole can be easily expanded and contracted. Therefore, the cover member can be more easily attached to the outer periphery portion of the skin opening hole.

BRIEF DESCRIPTION OF THE DRAWINGS

FIG. 1 is an external perspective view of a conveyance seat of the present embodiment.

FIG. 5A is an exploded perspective view of the inside cover, a skin material, and the outside cover.

FIG. 7 is a longitudinal sectional view of the cover member and illustrates a state where the anchor member is sandwiched by the inside cover and the outside cover.

DESCRIPTION OF THE PREFERRED EMBODIMENTS

Hereinafter, a conveyance seat according to an embodiment of the present invention will be described with reference to FIGS. 1 to 8B.

The present embodiment relates to an invention of a conveyance seat including a cover member protecting an anchor member extending to a seat front from a seat main body so that an object to be connected (child safety seat) is connected, in which the cover member includes an outside cover attached to the seat main body and covering the anchor member, and an inside cover attached to the outside cover in a state of being accommodated in the outside cover and having an anchor engaging portion engaging with the anchor member. When the cover member is engaged with the anchor member, an extending part of the anchor member extending to the seat front from the seat main body is sandwiched by the outside cover and the inside cover in a seat width direction.

It should be noted that the side where an occupant (seated occupant) sits with respect to the seat back of the conveyance seat is the front side of the seat.

Figure 2:
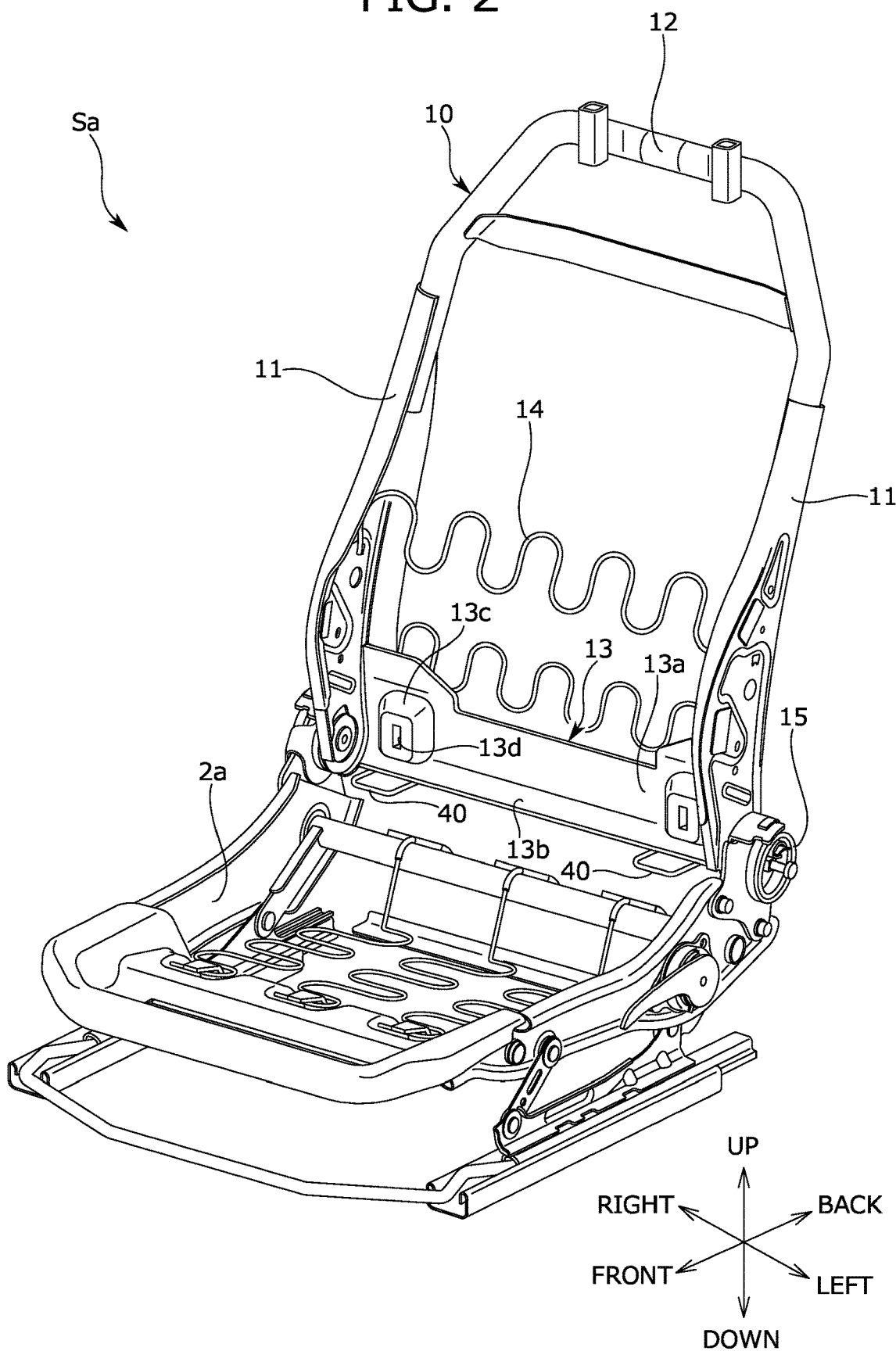
FIG. 2 is a perspective view of a seat frame and an anchor member.

As illustrated in FIG. 1, a conveyance seat S of the present embodiment is a vehicle seat to which a child safety seat can be connected and is configured mainly from a seat main body having a seat back 1, a seat cushion 2, and a headrest 3, an anchor member 40 attached to a seat frame Sa as the skeleton of the seat main body and extending to the seat front as illustrated in FIGS. 1 and 2, and a cover member 50 attached to the seat frame Sa and protecting the anchor member 40 from the outside.

Figure 3A:
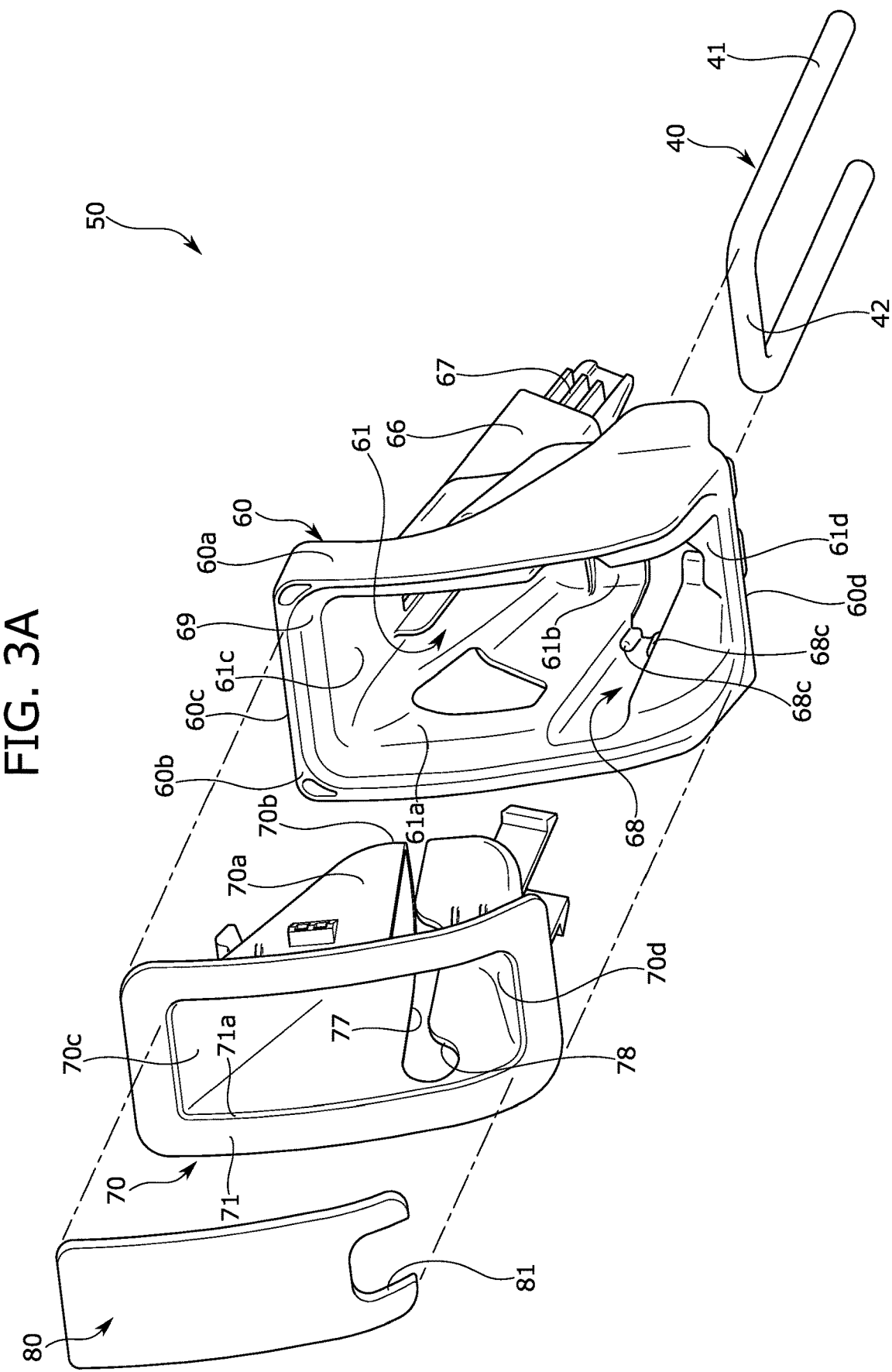
FIG. 3A is an exploded perspective view of a cover member (cap, inside cover, and outside cover) and the anchor member.
Figure 3B:
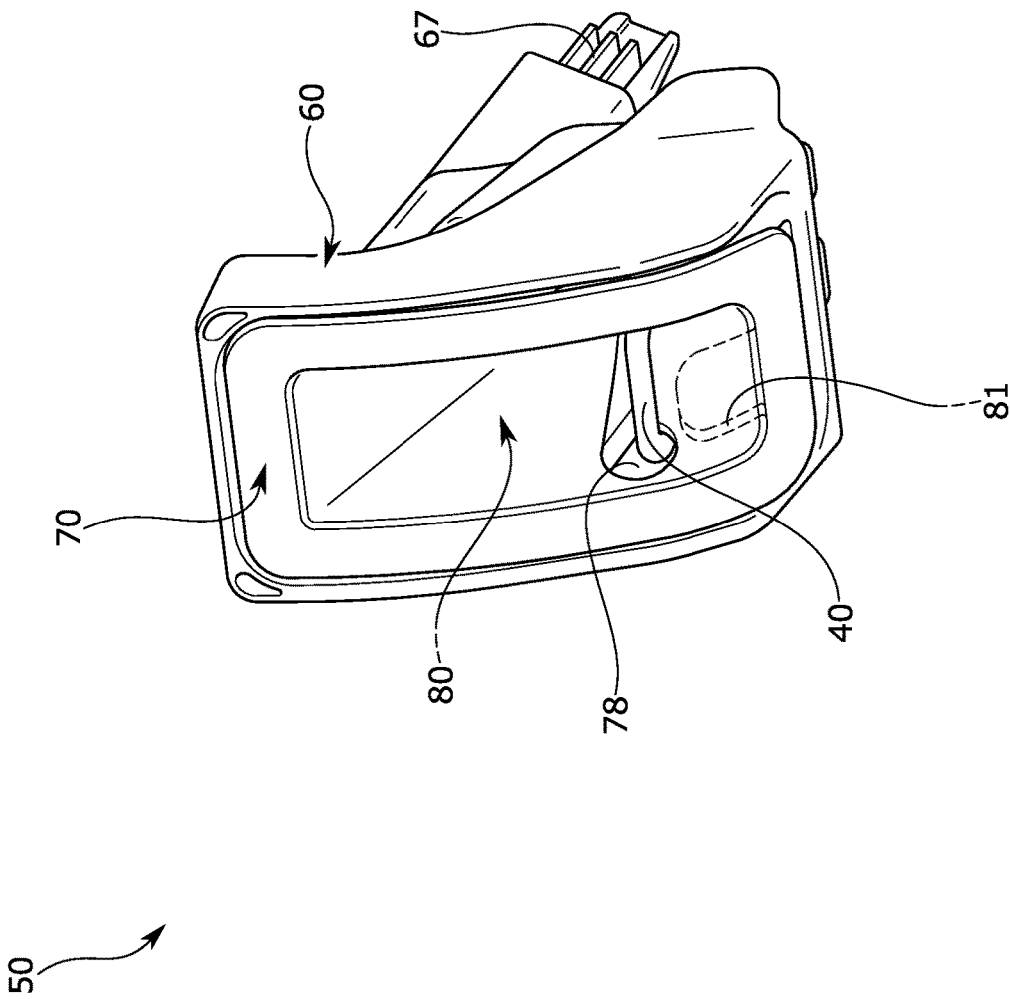
FIG. 3B is an assembly drawing of FIG. 3A.

As illustrated in FIGS. 3A and 3B, the cover member 50 is configured mainly from an outside cover 60 covering the anchor member 40 from the seat front, an inside cover 70 attached in a state of being accommodated in the outside cover 60 from the seat front and engaging with the anchor member 40, and a cap 80 attached to the inside cover 70 from the seat front.

As illustrated in FIGS. 1 and 2, the seat back 1 is a backrest portion supporting a seated occupant's back from behind and is configured by placing a pad member 20 on a back frame 10 as a skeleton and being covered with a skin material 30.

The seat cushion 2 is a seating portion supporting the seated occupant from below and is configured by placing a pad member 2b on a cushion frame 2a as a skeleton and being covered with a skin material 2c from above the pad member 2b.

The headrest 3 is a head portion supporting the seated occupant's head from behind and is configured by placing a pad member 3b on a headrest pillar as a core material and being covered with a skin material 3c.

As illustrated in FIG. 2, the back frame 10 as a rectangular frame body is configured mainly from right and left side frames 11 disposed on the right and left sides and extending in the up to down direction, an inverted U-shaped upper frame 12 interconnecting the upper end portions of the side frames 11, a substantially plate-shaped lower frame 13 interconnecting the lower end portions of the side frames 11, and a plurality of elastic springs 14 hooked to each side frame 11 and extending in a serpentine shape.

The side frame 11 is a sheet metal member having a substantially C-shaped cross section, extends in the up to down direction, and connects the upper frame 12 and the cushion frame 2a.

Specifically, the upper portions of the side frames 11 are attached so as to sandwich the pipe-shaped upper frame 12 from the outside in the seat width direction. In addition, the lower end portion of the side frame is connected to the rear end portion of the cushion frame 2a via a reclining device 15. In this state, the back frame 10 is capable of pivoting relative to the cushion frame 2a.

The lower frame 13 is a sheet metal member having a substantially L-shaped longitudinal section, extends in the seat width direction, and is attached to the inside surfaces of the right and left side frames 11.

The lower frame 13 has a side wall portion 13a extending in the up to down direction and a bottom wall portion 13b continuously bending from the lower end portion of the side wall portion 13a and extending to the seat front.

Frame protrusions 13c protruding so as to bulge to the seat front are respectively formed on the front surfaces of both right and left end portions of the lower frame 13 (side wall portion 13a). Further, an attachment portion 13d (attachment hole) for attaching the cover member 50 (frame attachment portion 67) is formed in the front surface of the frame protrusion 13c.

In addition, the anchor members 40 protruding to the seat front are respectively attached by welding to the bottom surfaces of both right and left end portions of the lower frame 13 (bottom wall portion 13b).

As illustrated in FIG. 1, the pad member 20 is a cushion material for the seat back 1 and attached to the front surface of the back frame 10.

A pad opening hole 21 is formed at the portion of the pad member 20 corresponding to the anchor member 40 (cover member 50) so that the anchor member 40 (cover member 50) passes therethrough in the seat front to back direction.

The pad opening holes 21 are opening holes having a substantially rectangular section, are formed in the lower end portion of the seat back 1, and are disposed on the right and left with an interval in the seat width direction.

As illustrated in FIGS. 1 and 5A, the skin material 30 is a covering material for the seat back 1 and covers the outer surfaces of the back frame 10 and the pad member 20.

The portion of the skin material 30 corresponding to the anchor member 40 (cover member 50) is provided with a skin opening hole 31 for exposing the anchor member 40 and a skin locking member 32 attached to the outer periphery portion of the skin opening hole 31 for locking to the cover member 50.

The skin opening holes 31 are substantially quadrangular opening holes, are formed in the lower end portion of the seat back 1, and are disposed on the right and left with an interval in the seat width direction.

The skin locking member 32 is a substantially rectangular plate-shaped trim plate made of resin or leather and is sewn to the outer periphery portion of the skin opening hole 31.

A plurality of the skin locking members 32 are disposed at intervals at the outer periphery portion of the skin opening hole 31. Specifically, the skin locking members 32 are respectively disposed at the upper end portion, both right and left end portions, and the lower end portion of the skin opening hole 31 and respectively disposed at positions avoiding the corner portions (four corners) of the skin opening hole 31.

Figure 5B:
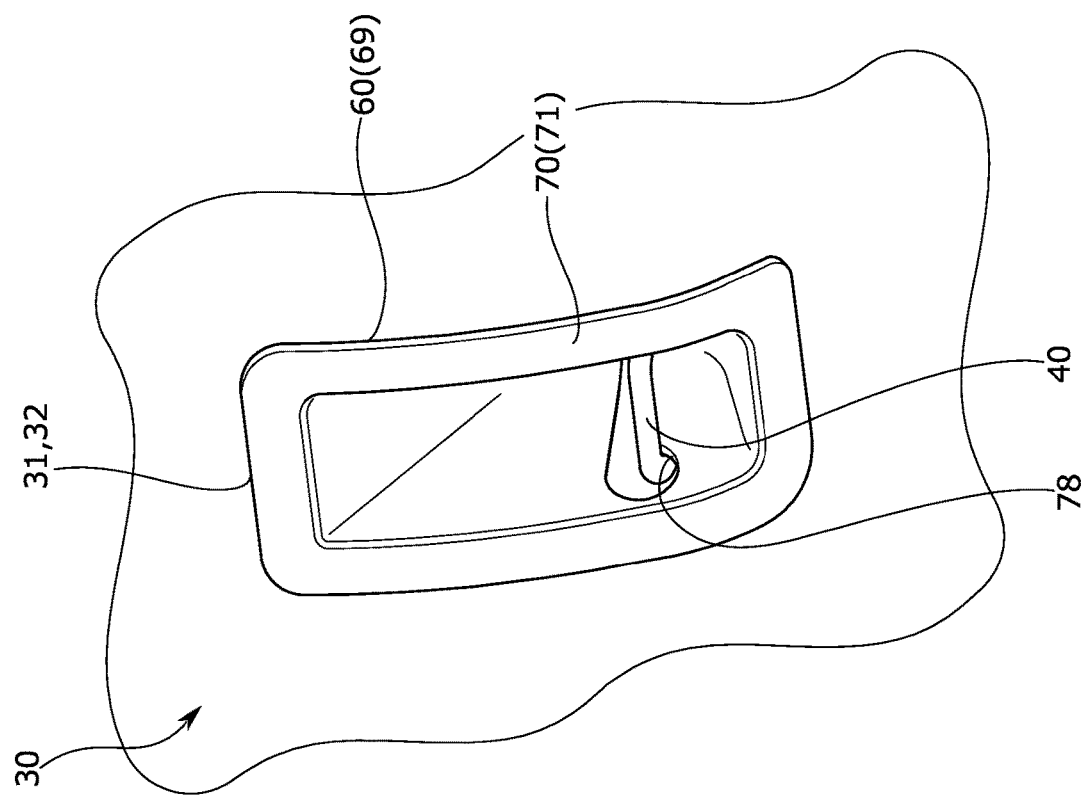
FIG. 5B is an assembly drawing of FIG. 5A.
Figure 6:
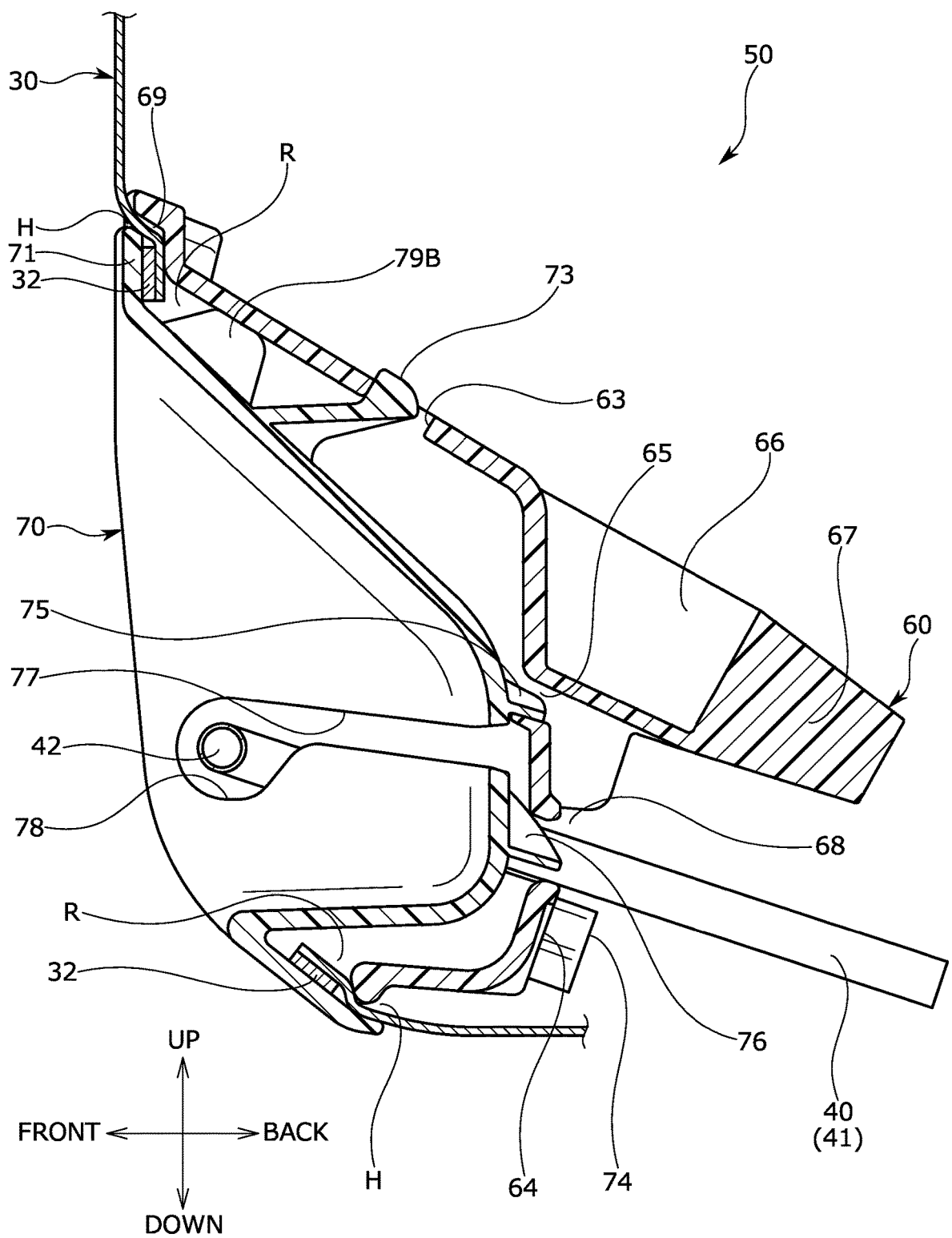
FIG. 6 is a longitudinal sectional view of the cover member and illustrates a state where a portion of the skin material is sandwiched by the inside cover and the outside cover.

In the above configuration, as illustrated in FIGS. 5A to 6, the outer periphery portion of the skin opening hole 31 and the skin locking member 32 are sandwiched between the outside cover 60 and the inside cover 70 in the seat front to back direction.

As illustrated in FIGS. 2 and 3A, the anchor member 40 is a substantially U-shaped wire member for child safety seat connection and is attached to the bottom surface of the back frame 10 (lower frame 13).

Specifically, the anchor member 40 is configured mainly from right and left anchor extending portions 41 extending to the seat front from the bottom surface of the back frame 10 and an anchor connecting portion 42 extending in the seat width direction in order to connect the extending end portions of the right and left anchor extending portions 41.

A connecting portion (connecting hook) provided on a child safety seat (not illustrated) is detachably connected to the anchor connecting portion 42 of the anchor member 40.

As illustrated in FIG. 1, the cover member 50 is a cover fitted into the pad opening hole 21 (skin opening hole 31) of the seat back 1 from the seat front and protecting the anchor member 40 from the outside and engages with each of the back frame 10 and the anchor member 40.

As illustrated in FIGS. 3A and 3B, the cover member 50 is configured from the outside cover 60, the inside cover 70, and the cap 80. Further, when the cover member 50 is engaged with the anchor member 40, the right and left anchor extending portions 41 of the anchor member 40 are sandwiched by the outside cover 60 and the inside cover 70 in the seat width direction (see FIG. 7).

As illustrated in FIGS. 3A to 4B, the outside cover 60 is a cover material having an anchor accommodating hole capable of accommodating the anchor member 40 by introducing the anchor member 40 from the seat rear and a cover accommodating recess capable of accommodating the inside cover 70 from the seat front, is fitted into the pad opening hole 21, and is attached to the back frame 10 (attachment portion 13d).

Specifically, the outside cover 60 has right and left side wall portions 60a provided with an interval in the seat width direction and extending in the seat front to back direction, a front wall portion 60b connecting the front end portions of the right and left side wall portions 60a, an upper wall portion 60c connecting the respective upper end portions of the right and left side wall portions 60a and the front wall portion 60b, and a bottom wall portion 60d connecting the respective lower end portions.

The front surface of the outside cover 60 (front wall portion 60b) is formed with a cover accommodating recess 61 provided so as to be recessed to the seat rear and capable of accommodating the inside cover 70.

The cover accommodating recess 61 has right and left second side wall portions 61a provided with an interval in the seat width direction and extending in the seat front to back direction, a rear wall portion 61b connecting the rear end portions of the right and left second side wall portions 61a, a second upper wall portion 61c connecting the respective upper end portions of the right and left second side wall portions 61a and the rear wall portion 61b, and a second bottom wall portion 61d connecting the respective lower end portions.

The right and left second side wall portions 61a of the cover accommodating recess 61 are formed with right and left side engaging holes 62 engaging with right and left side engaging claws 72 provided on the inside cover 70. Likewise, the second upper wall portion 61c is formed with an upper engaging hole 63 engaging with an upper engaging claw 73 provided on the inside cover 70.

In addition, the rear wall portion 61b is formed with a first rear engaging hole 64 and a second rear engaging hole 65 respectively engaging with a first rear engaging claw 74 and a second rear engaging claw 75 provided on the inside cover 70. A pair of the first rear engaging holes 64 are formed with an interval in the seat width direction.

Each of the side engaging hole 62, the upper engaging hole 63, the first rear engaging hole 64, and the second rear engaging hole 65 is an opening hole penetrating the cover accommodating recess 61 in the thickness direction.

A box-shaped cover protrusion 66 protruding to the seat rear is formed at a position above the first rear engaging hole 64 and the second rear engaging hole 65 in the rear wall portion 61b of the cover accommodating recess 61. Further, the frame attachment portion 67 for attachment to the attachment portion 13d of the back frame 10 is formed on the rear surface of the cover protrusion 66.

The frame attachment portion 67 is a grid-shaped attachment projection protruding to the seat rear from the rear surface of the cover protrusion 66 and is fitted into the attachment portion 13d (attachment hole) of the back frame 10.

In addition, the right and left second side wall portions 61a and the rear wall portion 61b of the cover accommodating recess 61 are provided with an anchor accommodating hole 68 for accommodating the anchor member 40 (right and left anchor extending portions 41), which is notch-formed toward the seat front in order to introduce the anchor member 40.

Specifically, the anchor accommodating hole 68 has an opening hole portion 68a for introducing the anchor member 40 and an accommodating hole portion 68b extending to the seat front continuously from the opening hole portion 68a and surrounded by the right and left second side wall portions 61a.

An anchor fitting portion 68c fitting to the anchor member 40 (anchor extending portion 41) is formed on the inside surface of the accommodating hole portion 68b of the anchor accommodating hole 68.

As illustrated in FIGS. 3A and 7, the anchor fitting portions 68c are fitting projections formed with a predetermined interval in the up to down direction and are disposed so as to sandwich the anchor member 40 (anchor extending portion 41) in the up to down direction.

As illustrated in FIGS. 3A to 4B, the inside cover 70 is a cover material having an anchor engaging portion capable of engaging with the anchor member 40 by introducing the anchor member 40 from the seat rear and is attached to the outside cover 60 in a state of being accommodated in the outside cover 60.

Specifically, the inside cover 70 has right and left side wall portions 70a provided with an interval in the seat width direction and extending in the seat front to back direction, a rear wall portion 70b connecting the rear end portions of the right and left side wall portions 70a, an upper wall portion 70c connecting the respective upper end portions of the right and left side wall portions 70a and the rear wall portion 70b, and a bottom wall portion 70d connecting the respective lower end portions.

In addition, a frame-shaped outer peripheral flange 71 protruding upward, downward, rightward, and leftward toward the outside of the inside cover 70 is formed at the outer periphery portion of the front surface of the inside cover 70.

The right and left side wall portions 70a of the inside cover 70 are formed with the right and left side engaging claws 72 engaging with the right and left side engaging holes 62 of the outside cover 60. Likewise, the upper wall portion 70c is formed with the upper engaging claw 73 engaging with the upper engaging hole 63 of the outside cover 60.

In addition, the rear wall portion 70b is formed with the first rear engaging claw 74, the second rear engaging claw 75, and a third rear engaging claw 76 respectively engaging with the first rear engaging hole 64, the second rear engaging hole 65, and the anchor accommodating hole 68 of the outside cover 60.

A pair of the first rear engaging claws 74 are formed with an interval in the seat width direction.

The side engaging claw 72, the upper engaging claw 73, and the second rear engaging claw 75 are disposed at positions above the anchor member 40. The first rear engaging claw 74 and the third rear engaging claw 76 are disposed at positions below the anchor member 40.

The right and left side wall portions 70a and the rear wall portion 70b of the inside cover 70 are provided with an anchor passing hole 77 extending in the extension direction of the anchor member 40 (right and left anchor extending portions 41), which is notch-formed toward the seat front (diagonally toward the seat front) in order to introduce the anchor member 40.

In addition, an anchor engaging portion 78 is formed at the front end portion of the anchor passing hole 77 on the side opposite to the anchor member 40 side and extends in a direction intersecting the extension direction of the anchor passing hole 77 continuously from the anchor passing hole 77.

The anchor engaging portion 78 is a substantially semi-circular engaging groove notch-formed downward from the front end portion of the anchor passing hole 77 and is disposed so as to detachably engage with respect to the anchor member 40 (anchor connecting portion 42).

It should be noted that the right and left side wall portions 70a and the upper wall portion 70c of the inside cover 70 are formed with abutting ribs 79 respectively abutting against the right and left second side wall portions 61a and the second upper wall portion 61c of the outside cover 60.

The abutting rib 79 has the function of abutting against the outer surface of the outside cover 60 to hold the inside cover 70 along with the function of reinforcing the inside cover 70.

Abutting ribs 79A are respectively formed in the upper and lower end portions of the right and left side wall portions 70a and are disposed at positions sandwiching the side engaging claw 72 and the anchor passing hole 77 in the up to down direction.

An abutting rib 79B is a substantially cross-shaped rib and is disposed at a portion around the upper engaging claw 73.

Figure 4A:
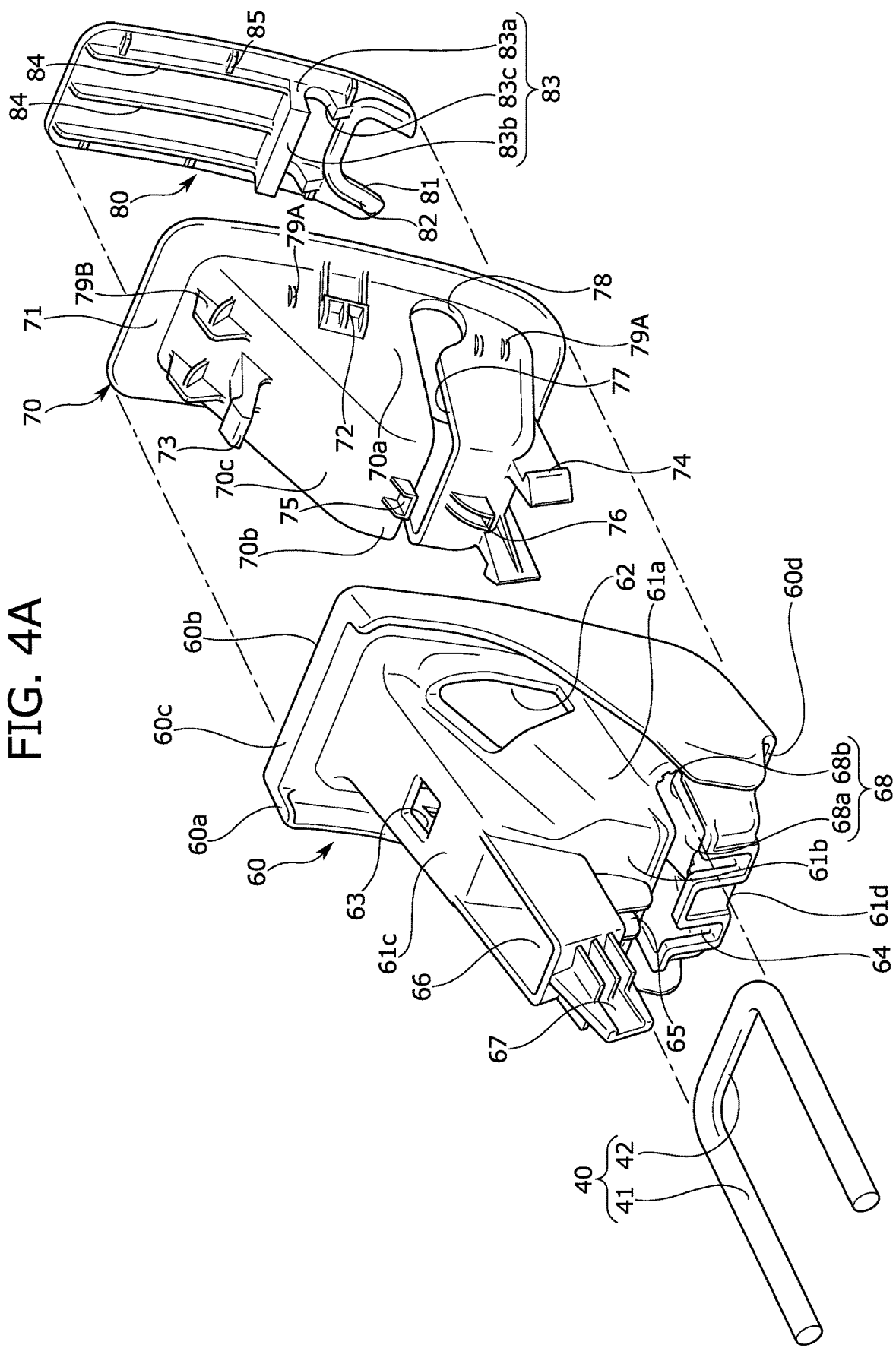
FIG. 4A is an exploded perspective view of the cover member and the anchor member seen from another angle.
Figure 4B:
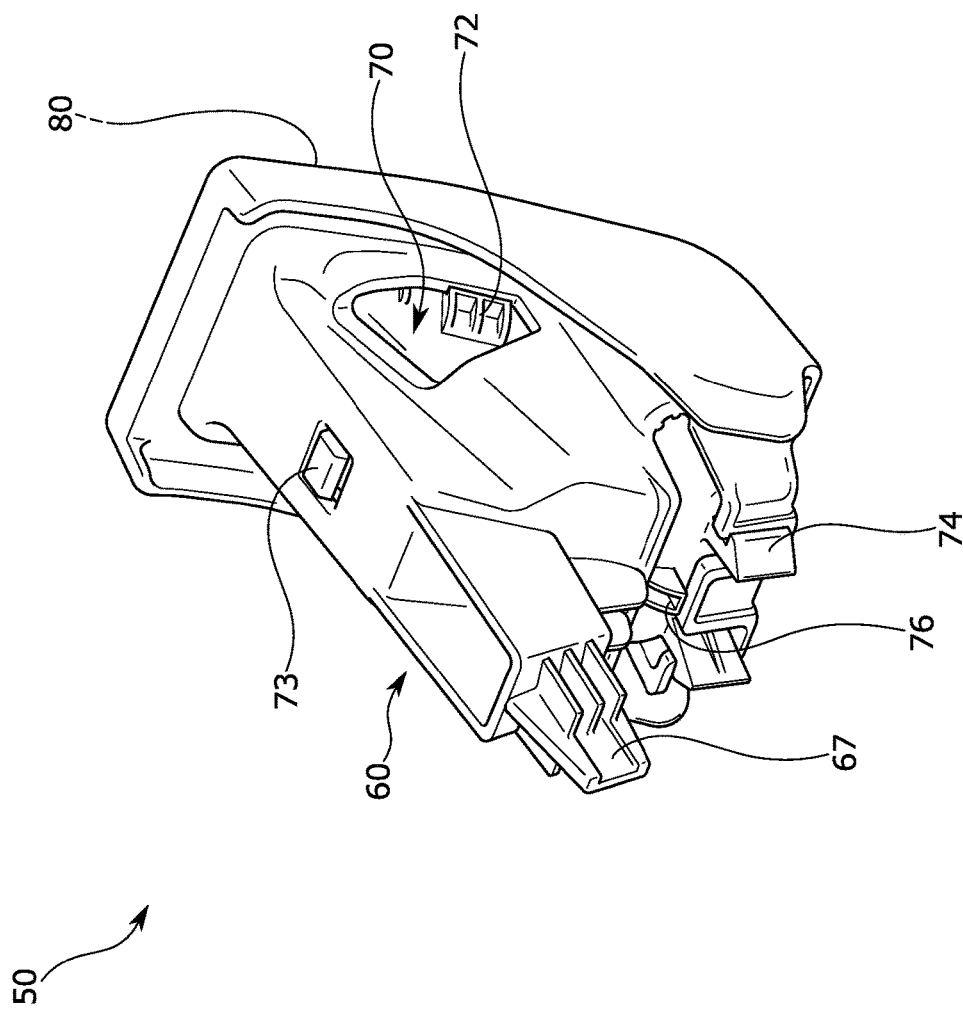
FIG. 4B is an assembly drawing of FIG. 4A.

As illustrated in FIGS. 3A and 4A, the cap 80 is a lid for the cover member 50, is removed from the opening portion of the inside cover 70 when the anchor member 40 is used, and is mounted on the opening portion of the inside cover 70 when the anchor member 40 is not used.

The lower end portion of the cap 80 is formed with a hooking portion 81 for an occupant to hook a finger and a substantially U-shaped reinforcement bulging portion 82 provided at the outer periphery portion of the hooking portion 81.

The hooking portion 81 is a substantially rectangular hooking hole and is notch-formed in the lower end portion of the cap 80.

The reinforcement bulging portion 82 is a bulging portion where a portion of the back surface of the cap 80 bulges rearward and is formed along the outer periphery portion of the hooking portion 81.

In addition, an anchor gripping portion 83 protruding toward the anchor member 40 is formed on the back surface of the lower portion of the cap 80 in order to grip the anchor member 40 (anchor connecting portion 42).

The anchor gripping portion 83 is a substantially inverted U-shaped body and has right and left side wall portions 83a extending rearward and formed with an interval in the right to left width direction, an upper wall portion 83b connecting the upper end portions of the right and left side wall portions 83a, and right and left gripping portions 83c (gripping holes) formed in the rear end portions of the right and left side wall portions 83a in order to sandwich the anchor member 40 in the up to down direction.

It should be noted that a plurality of vertical ribs 84 disposed at intervals in the right to left width direction and extending in the up to down direction and a plurality of horizontal ribs 85 disposed at intervals in the up to down direction and extending in the right to left width direction are respectively formed on the back surface of the cap 80.

The vertical ribs 84 and the horizontal ribs 85 are reinforcement ribs reinforcing the cap 80 and are connected to each other. In addition, the vertical ribs 84 and the horizontal ribs 85 are connected to the anchor gripping portion 83 as well.

Specifically, the vertical ribs 84 extend downward from the upper end portion of the cap 80 and abut against the anchor gripping portion 83. The horizontal ribs 85 respectively extend to the middle side from both end portions of the cap 80 in the right to left width direction and abut against the anchor gripping portion 83 or the vertical ribs 84.

In the above configuration, as illustrated in FIGS. 5A to 6, the cover member 50 is attached to the seat back 1 such that the outer periphery portion of the skin opening hole 31 and the skin locking member 32 are sandwiched by the outside cover 60 and the inside cover 70.

At this time, the outer surface of the inside cover 70, the outer surface of the cap 80, and the outer surface of the skin material 30 are substantially flush.

Specifically, the front surface of the inside cover 70 (outer peripheral flange 71) is formed with a stepped recess 71a accommodating the cap 80 and abutting against the outer periphery portion of the cap 80.

Therefore, the appearance of the periphery of the cover member 50 can be improved.

In addition, in the above configuration, as illustrated in FIGS. 5A to 6, a flange accommodating recess 69 is formed in the front surface of the outside cover 60 facing the inside cover 70 (outer peripheral flange 71).

At this time, the skin locking member 32 is accommodated in the flange accommodating recess 69 together with the outer peripheral flange 71 and is sandwiched between the outer peripheral flange 71 and the flange accommodating recess 69.

Therefore, the cover member 50 can be easily attached with respect to the skin material 30. In addition, it is possible to enhance the attachment rigidity of the cover member 50 with respect to the skin material 30.

In addition, exposure of the skin locking member 32 to the outside can be suppressed. Therefore, the appearance of the periphery of the cover member 50 can be improved.

In addition, in the above configuration, as illustrated in FIG. 6, an accommodating space R for accommodating the skin locking member 32 is formed between the outer peripheral flange 71 and the flange accommodating recess 69 when the inside cover 70 is attached to the outside cover 60.

Further, a skin passing hole H leading to the accommodating space R is formed in the gap between the outer periphery portion of the front surface of the outside cover 60 facing the inside cover 70 and the outer peripheral flange 71 of the inside cover 70.

At this time, the skin passing hole H is formed so as to be narrower than the skin locking member 32.

Therefore, it is possible to enhance the attachment rigidity of the cover member 50 with respect to the skin material 30 (skin locking member 32). In addition, it is possible to suppress the skin locking member 32 coming off the cover member 50.

Second Embodiment of Cover Member

Figure 8A:
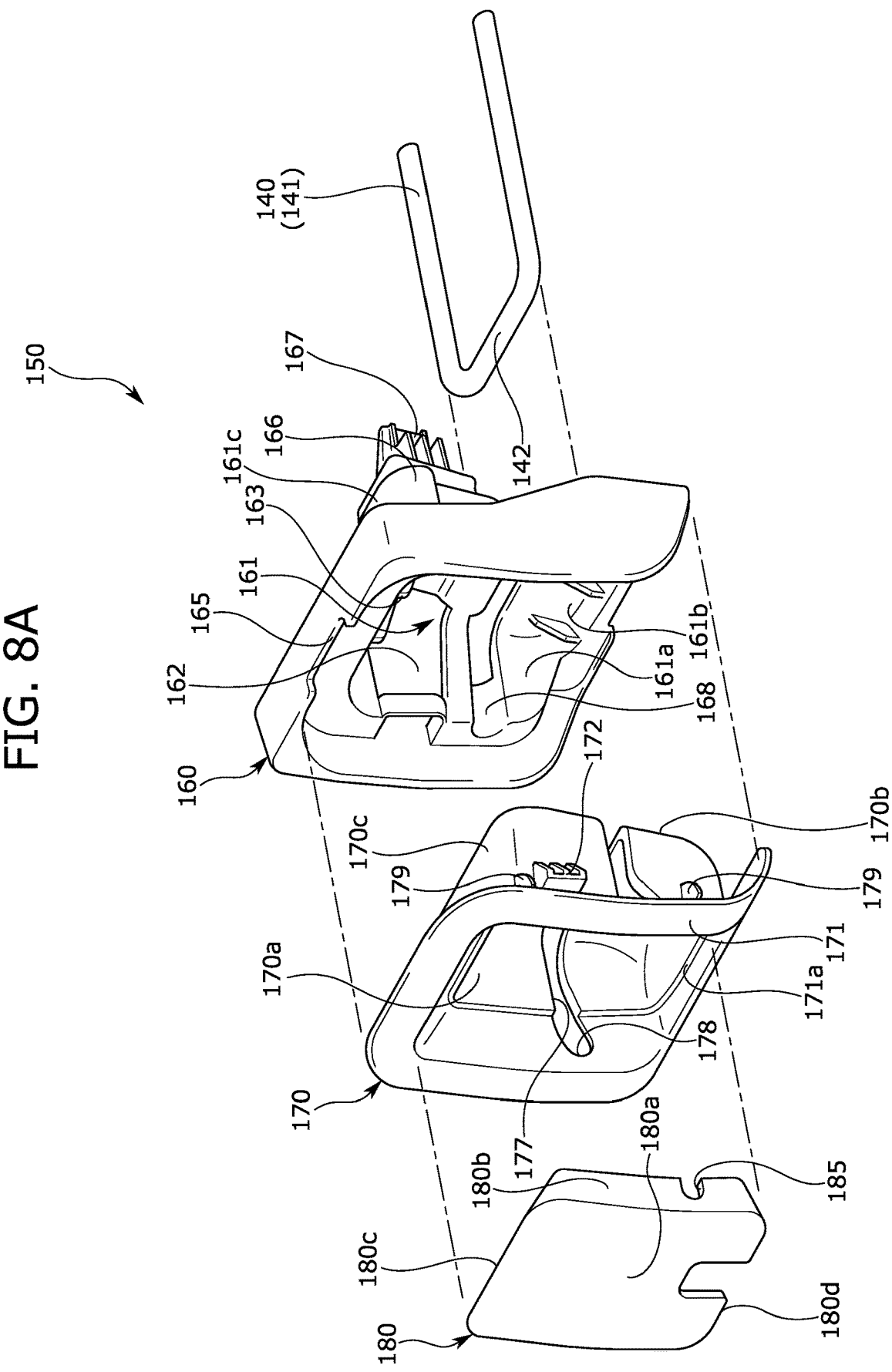
FIG. 8A is an exploded perspective view of a cover member of a second embodiment.
Figure 8B:
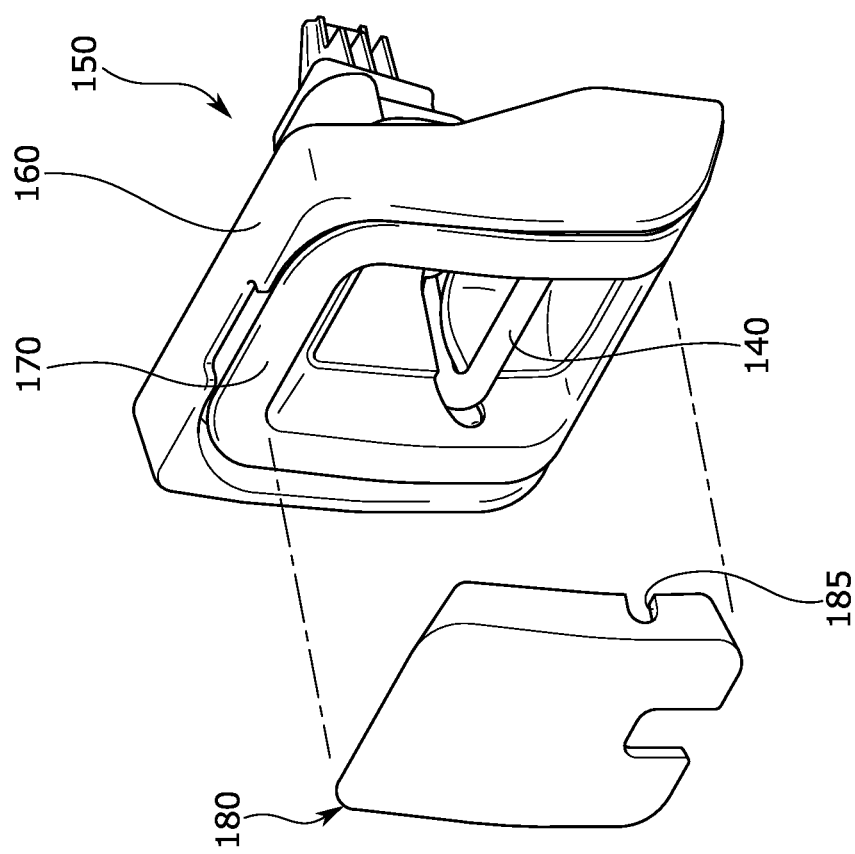
FIG. 8B is an assembly drawing of FIG. 8A.

Next, a second embodiment of the cover member will be described with reference to FIGS. 8A and 8B.

It should be noted that description of content that overlaps with the conveyance seat S described above will be omitted.

A cover member 150 of the second embodiment is configured from an outside cover 160, an inside cover 170, and a cap 180. Further, when the cover member 150 is engaged with an anchor member 140, right and left anchor extending portions 141 are sandwiched by the outside cover 160 and the inside cover 170 in the seat width direction.

A cover accommodating recess 161 is formed in the front surface of the outside cover 160.

Right and left side engaging holes 162 engaging with right and left side engaging claws 172 provided on the inside cover 170 are formed in right and left second side wall portions 161a of the cover accommodating recess 161. A second upper wall portion 161c is formed with an upper abutting rib 163 abutting against the inside cover 170.

In addition, a rear wall portion 161b is formed with a rear abutting rib 164 abutting against the inside cover 170. A pair of the rear abutting ribs 164 are formed with an interval in the seat width direction.

The rear wall portion 161b of the cover accommodating recess 161 is formed with a box-shaped cover protrusion 166 protruding to the seat rear. Further, the rear surface of the cover protrusion 166 is formed with a frame attachment portion 167 for attachment to a back frame 110.

In addition, the right and left second side wall portions 161a and the rear wall portion 161b of the cover accommodating recess 161 are provided with an anchor accommodating hole 168 for introducing the anchor member 140 and accommodating the right and left anchor extending portions 141.

A frame-shaped outer peripheral flange 171 is formed at the outer periphery portion of the front surface of the inside cover 170.

Right and left side wall portions 170a of the inside cover 170 are formed with the side engaging claws 172 engaging with the right and left side engaging holes 162 of the outside cover 160.

The right and left side wall portions 170a and a rear wall portion 170b of the inside cover 170 are provided with an anchor passing hole 177 where the anchor member 140 is introduced.

In addition, an anchor engaging portion 178 is formed at the front end portion of the anchor passing hole 177 on the side opposite to the anchor member 140 side.

It should be noted that the right and left side wall portions 170a of the inside cover 170 are formed with abutting ribs 179 abutting against the right and left second side wall portions 161a of the outside cover 160.

In the above configuration, the upper and lower end portions of the front surface of the outside cover 160 are respectively formed with removal holes 165 notch-formed toward the rear of the outside cover 160 so that an occupant removes the inside cover 170 by hooking a finger.

Therefore, the inside cover 170 can be easily removed from the outside cover 160.

The cap 180 has a substantially U-shaped cross section and has a planar front wall portion 180a, right and left side wall portions 180b extending rearward from both end portions of the front wall portion 180a in the right to left width direction, an upper wall portion 180c connecting the respective upper end portions of the front wall portion 180a and the right and left side wall portions 180b, and a bottom wall portion 180d connecting the respective lower end portions.

When the cap 180 is accommodated in the inside cover 170 in this configuration, each of the front wall portion 180a, the right and left side wall portions 180b, and the bottom wall portion 180d abuts against a stepped recess 171a of the inside cover 170.

In addition, the right and left side wall portions 180b of the cap 180 are formed with right and left notch holes 185 for suppressing interference with the anchor member 140.

Other Embodiments

Although the anchor member 40 in the above embodiment is attached to the lower end portion of the seat back 1 (back frame 10) as illustrated in FIG. 1, this can be changed without being particularly limited.

For example, the anchor member 40 may be attached to the rear end of the seat cushion 2 (cushion frame 2a). Alternatively, the anchor member 40 may be attached to a vehicle body.

Although the anchor member 40 in the above embodiment connects a child safety seat as illustrated in FIG. 1, this can be changed without being particularly limited to child safety seats.

For example, the anchor member 40 may be used to connect objects to be connected such as other conveyance accessories (interior goods for conveyances) and luggage.

Although the cover member 50 in the above embodiment is a cover protecting the anchor member 40 as illustrated in FIGS. 1, 5A, and 5B, the cover member 50 may protect other conveyance accessories (interior goods for conveyances) without being particularly limited to the anchor member 40.

For example, the cover member 50 may be attached to the seat main body (shoulder portion of seat back, front end portion of seat cushion) so as to sandwich the skin material 30 with the outside cover 60 and the inside cover 70 and protect an operating lever for switching the state of the seat main body. Alternatively, the cover member 50 may protect a seat belt of a seat belt device (not illustrated). In that case, it is preferable to guide the extension direction of the seat belt.

Although the cover member 50 in the above embodiment is configured from the outside cover 60, the inside cover 70, and the cap 80 as illustrated in FIGS. 3A and 3B, the configuration is not particularly limited and the cap 80 may be unnecessary.

Although the anchor extending portion 41 is sandwiched by the outside cover 60 and the inside cover 70 in the seat width direction as illustrated in FIGS. 3A, 3B, and 7 when the cover member 50 in the above embodiment is engaged with the anchor member 40, this can be changed without being particularly limited.

For example, the cover member 50 may sandwich the anchor extending portion 41 in the up to down direction with the outside cover 60 and the inside cover 70. Alternatively, the anchor extending portion 41 may be sandwiched by the outside cover 60 and the inside cover 70 in the seat front to back direction.

Although the anchor engaging portion 78 in the above embodiment extends downward from the front end portion of the anchor passing hole 77 as illustrated in FIG. 3A, this can be changed without being particularly limited.

For example, the anchor engaging portion 78 may extend upward from the front end portion of the anchor passing hole 77. Alternatively, the anchor engaging portion 78 may extend further forward from the front end portion of the anchor passing hole 77 and be narrow.

Although the inside cover 70 in the above embodiment has the right and left side engaging claws 72, the upper engaging claw 73, and the rear engaging claws 74, 75, and 76 as illustrated in FIG. 4A, this can be changed without being particularly limited.

For example, the inside cover 70 may have only the right and left side engaging claws 72. Alternatively, the inside cover 70 may have only the upper engaging claw 73 and the rear engaging claw 74. Alternatively, the inside cover 70 may have only the right and left side engaging claws 72 and the upper engaging claw 73.

Further, the outside cover 60 is preferably formed with an engaging hole at a portion corresponding to an engaging claw of the inside cover 70.

Although a conveyance seat used in an automobile has been described as a specific example in the above embodiments, the present invention is not particularly limited and can also be used for seats for conveyances such as airplanes and ships as well as seats for conveyances such as trains and buses.

In the above embodiments, the conveyance seat according to the present invention has been mainly described.

However, the above embodiments are merely examples for facilitating understanding of the present invention and do not limit the present invention. The present invention can be modified and improved without departing from the spirit thereof, and it is a matter of course that the present invention includes equivalents thereof.

REFERENCE SIGNS LIST

S: conveyance seat (vehicle seat)
   Sa: seat frame
1: seat back
2: seat cushion
   2a: cushion frame
   2b, 3b: pad member
   2c, 3c: skin material
3: headrest
10, 110: back frame
11: side frame
12: upper frame
13: lower frame
   13a: side wall portion
   13b: bottom wall portion
   13c: frame protrusion
   13d: attachment portion (attachment hole)
14: elastic spring
15: reclining device
20: pad member
21: pad opening hole
30: skin material
31: skin opening hole
32: skin locking member
40, 140: anchor member
41, 141: anchor extending portion
42: anchor connecting portion
50, 150: cover member
60, 160: outside cover
   60a: side wall portion
   60b: front wall portion
   60c: upper wall portion
   60d: bottom wall portion
61, 161: cover accommodating recess
   61a, 161a: second side wall portion
   61b, 161b: rear wall portion
   61c, 161c: second upper wall portion
   61d: second bottom wall portion
62, 162: side engaging hole
63: upper engaging hole
64: first rear engaging hole
65: second rear engaging hole
66, 166: cover protrusion
67, 167: frame attachment portion (attachment projection)
68, 168: anchor accommodating hole
   68a: opening hole portion
   68b: accommodating hole portion
   68c: anchor fitting portion
69: flange accommodating recess
163: upper abutting rib
164: rear abutting rib
165: removal hole
70, 170: inside cover
   70a, 170a: side wall portion
   70b, 170b: rear wall portion
   70c, 170c: upper wall portion
   70d: bottom wall portion
71, 171: outer peripheral flange
   71a, 171a: stepped recess
72, 172: side engaging claw
73: upper engaging claw
74: first rear engaging claw
75: second rear engaging claw
76: third rear engaging claw
77, 177: anchor passing hole
78, 178: anchor engaging portion
79 (79A, 79B), 179: abutting rib
80, 180: cap
81: hooking portion
82: reinforcement bulging portion
83: anchor gripping portion
   83a: side wall portion
   83b: upper wall portion
   83c: gripping portion
84: vertical rib
85: horizontal rib
180a: front wall portion
180b: side wall portion
180c: upper wall portion
180d: bottom wall portion
185: notch hole
H: skin passing hole
R: accommodating space

What is claimed is:

1. A conveyance seat comprising a cover member protecting an anchor member extending outward from a conveyance main body or a seat main body so that an object to be connected is connected, wherein:

the cover member includes:
an outside cover attached to the seat main body and covering the anchor member, and
an inside cover attached to the outside cover in a state of being accommodated in the outside cover and having an anchor engaging portion engaging with the anchor member, when the cover member is engaged with the anchor member, an extending part of the anchor member extending outward from the conveyance main body or the seat main body is sandwiched by the outside cover and the inside cover, the seat main body has a skin material serving as a covering material for the seat main body, a portion of the skin material corresponding to the cover member is provided with a skin opening hole for exposing the anchor member, a skin locking member for locking to the cover member is attached to an outer periphery portion of the skin opening hole of the skin material, the cover member is attached to the seat main body such that the outer periphery portion of the skin opening hole is sandwiched by the outside cover and the inside cover, an outer peripheral flange protruding toward an outside of the inside cover is formed at an outer periphery portion of the inside cover, a surface of the outside cover facing the inside cover is formed with a flange accommodating recess in order to accommodate the outer peripheral flange, the flange accommodating recess is formed so as to be recessed toward a side opposite to the inside cover side, and the skin locking member is accommodated in the flange accommodating recess together with the outer peripheral flange and is sandwiched between the outer peripheral flange and the flange accommodating recess.

2. The conveyance seat according to claim 1, wherein:

the cover member protects the anchor member extending to a seat front from the conveyance main body or the seat main body so that a child safety seat is connected, when the inside cover is attached to the outside cover, an accommodating space for accommodating the skin locking member is formed between the outer peripheral flange and the flange accommodating recess, a skin passing hole leading to the accommodating space is formed in a gap between an outer periphery portion of the surface of the outside cover facing the inside cover and the outer peripheral flange of the inside cover, and the skin passing hole is formed so as to be narrower than the skin locking member.

3. The conveyance seat according to claim 2, wherein an outer surface of the inside cover and an outer surface of the skin material are substantially flush when the cover member is attached to the seat main body in a state of sandwiching the outer periphery portion of the skin opening hole.

4. The conveyance seat according to claim 1, wherein:

the skin opening hole is a polygonal opening hole, and a plurality of the skin locking members are disposed at intervals at the outer periphery portion of the skin opening hole, and the plurality of the skin locking members are respectively disposed between corner portions of the outer periphery portion of the skin opening hole, and are respectively disposed at positions that do not overlap the corner portions.

* * * * *